(12) United States Patent
Schuler et al.

(10) Patent No.: US 9,201,584 B2
(45) Date of Patent: Dec. 1, 2015

(54) AUDIO/VISUAL DEVICE USER INTERFACE WITH TACTILE FEEDBACK

(75) Inventors: David L. Schuler, Ashland, MA (US); John Michael Sakalowsky, West Newton, MA (US); Santiago Carvajal, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 13/448,657

(22) Filed: Apr. 17, 2012

(65) Prior Publication Data

US 2013/0106734 A1    May 2, 2013

Related U.S. Application Data

(63) Continuation-in-part of application No. 12/613,943, filed on Nov. 6, 2009.

(51) Int. Cl.
| | |
|---|---|
| *G06F 3/0488* | (2013.01) |
| *G06F 3/0482* | (2013.01) |
| *H04N 21/422* | (2011.01) |
| *H04N 21/431* | (2011.01) |
| *H04N 21/472* | (2011.01) |
| *G06F 3/0362* | (2013.01) |
| *G06F 3/0354* | (2013.01) |

(52) U.S. Cl.
CPC ............ *G06F 3/0488* (2013.01); *G06F 3/0362* (2013.01); *G06F 3/03547* (2013.01); *G06F 3/0482* (2013.01); *H04N 21/42224* (2013.01); *H04N 21/4312* (2013.01); *H04N 21/47217* (2013.01); *G06F 2203/014* (2013.01)

(58) Field of Classification Search
CPC .......................... G06F 3/04812; G06F 3/0482
USPC .......................................................... 345/173
See application file for complete search history.

(56) References Cited

U.S. PATENT DOCUMENTS

| | | |
|---|---|---|
| 4,786,767 A | 11/1988 | Kuhlman |
| 4,825,209 A | 4/1989 | Sasaki et al. |
| 5,222,895 A | 6/1993 | Fricke |

(Continued)

FOREIGN PATENT DOCUMENTS

| | | |
|---|---|---|
| EP | 0838945 A2 | 4/1998 |
| EP | 1052849 A1 | 11/2000 |

(Continued)

OTHER PUBLICATIONS

Invitation to Pay Additional Fees dated Feb. 18, 2011 for PCT/US2010/055628.

(Continued)

*Primary Examiner* — Waseem Moorad
(74) *Attorney, Agent, or Firm* — Bose Corporation

(57) ABSTRACT

A user interface for an audio/visual device includes a touch sensor in which the touch sensor is vibrated by an actuator coupled thereto to provide a user with a virtual texture for a corresponding menu on which the user is provided with the impression that menu item have textures, where the menu may extend about the periphery of a display element so as to at least partially surround a display area in which a visual portion of an audio/visual program may be played and possibly in a manner corresponding to how a surface defined on the touch sensor at least partially surrounds another manually-operable control.

26 Claims, 5 Drawing Sheets

(56) References Cited

U.S. PATENT DOCUMENTS

| | | | |
|---|---|---|---|
| 5,327,160 A | 7/1994 | Asher | |
| 5,367,199 A | 11/1994 | Lefkowitz et al. | |
| 5,371,553 A | 12/1994 | Kawamura et al. | |
| 5,408,275 A | 4/1995 | Song et al. | |
| 5,508,703 A | 4/1996 | Okamura et al. | |
| 5,545,857 A | 8/1996 | Lee et al. | |
| 5,589,893 A | 12/1996 | Gaughan et al. | |
| 5,691,778 A | 11/1997 | Song | |
| 5,790,820 A | 8/1998 | Vayda et al. | |
| 5,990,890 A | 11/1999 | Etheredge | |
| 6,067,081 A | 5/2000 | Hahlganss et al. | |
| 6,094,156 A | 7/2000 | Henty | |
| 6,118,435 A | 9/2000 | Fujita et al. | |
| 6,128,009 A | 10/2000 | Ohkura et al. | |
| 6,215,417 B1 | 4/2001 | Krass et al. | |
| 6,218,966 B1 | 4/2001 | Goodwin et al. | |
| 6,313,851 B1 | 11/2001 | Matthews, III et al. | |
| 6,317,128 B1 * | 11/2001 | Harrison et al. | 345/629 |
| 6,396,523 B1 | 5/2002 | Segal et al. | |
| 6,445,284 B1 | 9/2002 | Cruz-Hernandez et al. | |
| 6,448,986 B1 * | 9/2002 | Smith | 715/801 |
| 6,538,643 B2 | 3/2003 | Mori et al. | |
| 6,570,994 B1 | 5/2003 | Berthoud et al. | |
| 6,574,083 B1 | 6/2003 | Krass et al. | |
| 6,628,195 B1 | 9/2003 | Coudon | |
| 6,633,281 B2 | 10/2003 | Lin et al. | |
| 6,636,202 B2 | 10/2003 | Ishmael, Jr. et al. | |
| 6,701,525 B1 | 3/2004 | Neervoort et al. | |
| 6,750,803 B2 | 6/2004 | Yates et al. | |
| 6,765,557 B1 | 7/2004 | Segal et al. | |
| 6,834,373 B2 | 12/2004 | Dieberger | |
| 6,957,386 B2 | 10/2005 | Nishina et al. | |
| 7,009,595 B2 | 3/2006 | Roberts et al. | |
| 7,034,814 B2 | 4/2006 | Gong et al. | |
| 7,036,091 B1 | 4/2006 | Nguyen | |
| 7,139,623 B2 | 11/2006 | Adams et al. | |
| 7,170,428 B2 | 1/2007 | Himberg et al. | |
| 7,174,518 B2 | 2/2007 | Kim | |
| 7,269,484 B2 | 9/2007 | Hein | |
| 7,336,266 B2 | 2/2008 | Hayward et al. | |
| 7,453,442 B1 | 11/2008 | Poynter | |
| 7,548,232 B2 | 6/2009 | Shahoian et al. | |
| 7,574,672 B2 | 8/2009 | Jobs et al. | |
| 7,589,714 B2 | 9/2009 | Funaki | |
| 7,616,192 B2 | 11/2009 | Schroeder | |
| 7,663,604 B2 | 2/2010 | Maruyama et al. | |
| 7,701,445 B2 | 4/2010 | Inokawa et al. | |
| 7,745,211 B2 | 6/2010 | Takayama et al. | |
| 7,769,417 B2 | 8/2010 | Tierling et al. | |
| 7,825,903 B2 | 11/2010 | Anastas et al. | |
| 2002/0078445 A1 | 6/2002 | Sharif et al. | |
| 2002/0154888 A1 | 10/2002 | Allen et al. | |
| 2002/0180707 A1 | 12/2002 | Sato et al. | |
| 2003/0022701 A1 | 1/2003 | Gupta | |
| 2003/0058265 A1 | 3/2003 | Robinson et al. | |
| 2004/0252104 A1 | 12/2004 | Nakamura et al. | |
| 2004/0252109 A1 | 12/2004 | Trent et al. | |
| 2005/0030292 A1 | 2/2005 | Diederiks | |
| 2005/0030434 A1 | 2/2005 | Sata et al. | |
| 2005/0054390 A1 | 3/2005 | Tuovinen | |
| 2005/0081164 A1 | 4/2005 | Hama et al. | |
| 2005/0151727 A1 | 7/2005 | Kwong | |
| 2005/0264538 A1 | 12/2005 | Yeh | |
| 2006/0119585 A1 | 6/2006 | Skinner | |
| 2006/0119586 A1 * | 6/2006 | Grant et al. | 345/173 |
| 2007/0105591 A1 | 5/2007 | Chan | |
| 2007/0220418 A1 * | 9/2007 | Matsui et al. | 715/511 |
| 2007/0231901 A1 | 10/2007 | Takayama et al. | |
| 2007/0243627 A1 | 10/2007 | Takayama et al. | |
| 2007/0256029 A1 | 11/2007 | Maxwell | |
| 2008/0030463 A1 | 2/2008 | Forest | |
| 2008/0047765 A1 | 2/2008 | Proctor | |
| 2008/0058022 A1 * | 3/2008 | Ahn | 345/173 |
| 2008/0161065 A1 | 7/2008 | An et al. | |
| 2008/0251364 A1 | 10/2008 | Takala et al. | |
| 2009/0002328 A1 | 1/2009 | Ullrich et al. | |
| 2009/0109183 A1 | 4/2009 | Carvajal et al. | |
| 2009/0153288 A1 | 6/2009 | Hope et al. | |
| 2009/0181724 A1 | 7/2009 | Pettersson | |
| 2009/0195512 A1 | 8/2009 | Pettersson | |
| 2009/0210815 A1 | 8/2009 | Cheng et al. | |
| 2009/0275406 A1 | 11/2009 | Bytnar et al. | |
| 2010/0013653 A1 * | 1/2010 | Birnbaum et al. | 340/669 |
| 2010/0052880 A1 | 3/2010 | Laitinen et al. | |
| 2010/0144395 A1 | 6/2010 | Komiya | |
| 2010/0146451 A1 | 6/2010 | Jun-Dong et al. | |
| 2010/0156843 A1 | 6/2010 | Paleczny et al. | |
| 2010/0171715 A1 | 7/2010 | Peterson et al. | |
| 2010/0201652 A1 | 8/2010 | Caliskan et al. | |
| 2010/0231367 A1 | 9/2010 | Cruz-Hernandez et al. | |
| 2010/0231539 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2011/0066980 A1 | 3/2011 | Chmielewski et al. | |

FOREIGN PATENT DOCUMENTS

| | | | |
|---|---|---|---|
| EP | 1418673 A1 | 5/2004 | |
| EP | 1450247 A1 | 8/2004 | |
| EP | 1488389 A1 | 12/2004 | |
| EP | 1655953 A1 | 5/2006 | |
| EP | 1944677 A2 | 7/2008 | |
| EP | 2000885 A1 | 12/2008 | |
| EP | 2060967 A1 | 5/2009 | |
| EP | 2169515 A1 | 3/2010 | |
| JP | 2003308009 A | 10/2003 | |
| JP | 2005322566 A | 11/2005 | |
| JP | 2007066031 A | 3/2007 | |
| WO | 9200559 A1 | 1/1992 | |
| WO | 9934564 A1 | 7/1999 | |
| WO | 2005/109165 A2 | 11/2005 | |
| WO | 2007/040531 A1 | 4/2007 | |
| WO | 2008/038882 A1 | 4/2008 | |
| WO | 2009039433 A1 | 3/2009 | |

OTHER PUBLICATIONS

International Search Report and Written Opinion dated Apr. 14, 2011 for PCT/US2010/055628.

Daily Record, Oct. 6, 2007: "Gadgets and Gizmos"; www.sony.co.uk.

* cited by examiner

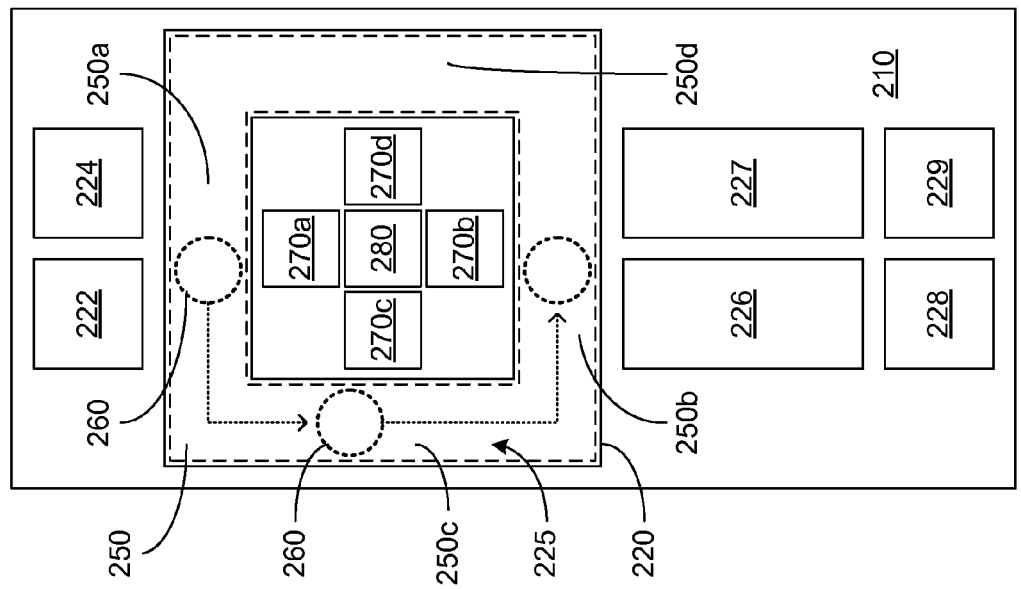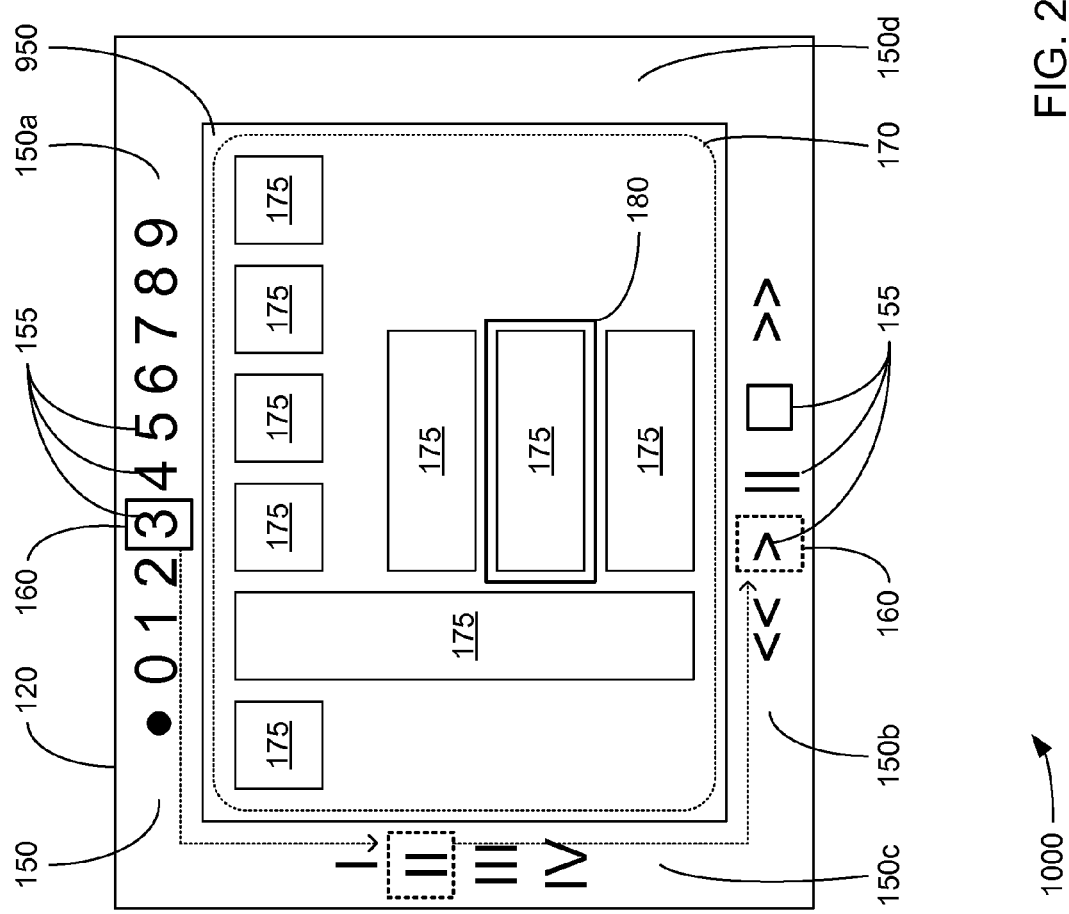
FIG. 2

AUDIO/VISUAL DEVICE USER INTERFACE WITH TACTILE FEEDBACK

CROSS-REFERENCE TO RELATED APPLICATIONS

The present application is a continuation-in-part of application Ser. No. 12/613,943 filed Nov. 6, 2009 by Santiago Carvajal and John M. Sakalowsky, the disclosure of which is incorporated herein by reference.

TECHNICAL FIELD

This disclosure relates to user interfaces incorporating a visual display and/or a touch-sensitive control.

BACKGROUND

Part of enjoying the playing of an audio/visual program (e.g., a piece of music, a recorded lecture, a recorded live performance, a movie, a slideshow, family pictures, an episode of a television program, etc.) is the task of selecting the desired audio/visual program to be played. Unfortunately, the increasing variety of choices of sources of audio/visual programs and the increasing variety of mechanisms by which audio/visual programs are able to be stored and played has greatly complicated what was once the relatively simple act of watching or listening to the playing of an audio/visual program to enjoy it.

For example, those wishing to "tune in" an audio/visual program being broadcast must now select a channel on which to view an audio/visual program from as many as 500 channels available through typical cable and/or satellite connections for television and/or radio. Further, it has become commonplace to employ audio/visual devices that are able to be programmed to autonomously tune in and record an audio/visual program for playing at a later time. Still further, it is now becoming increasingly commonplace to obtain audio/visual programs from websites accessible through the Internet. Yet further, some of these possible sources of audio/visual programs require paid subscriptions for which key cards and/or decryption keys are required to gain access to at least some audio/visual programs.

Those seeking to avail themselves of even a modest subset of such a wide array of options for playing an audio/visual program have often found themselves having to obtain multiple audio/visual devices (e.g., tuners, descramblers, disc media players, video recorders, web access devices, digital file players, televisions, visual displays without tuners, etc.). Each such audio/visual device often has a unique user interface, and more often than not, is accompanied by a separate handheld wireless remote control by which it is operated.

SUMMARY

A user interface for an audio/visual device includes a touch sensor in which the touch sensor is vibrated by an actuator coupled thereto to provide a user with a virtual texture for a corresponding menu on which the user is provided with the impression that menu item have textures.

In one aspect, an apparatus includes a touch sensor having a touch-sensitive surface that is manually operable with a digit of a hand of a user, and on which at least a portion of a racetrack surface is defined; an actuator coupled to the touch sensor to cause vibratory movement of the touch sensor; a processing device; and a storage accessible to the processing device and storing a sequence of instructions. When that sequence of instructions is executed by the processing device, the processing device is caused to, in response to an indication of the digit touching the racetrack surface at a position on the racetrack surface: cause a marker to be visually displayed at a location on a menu visually displayed on a display element that corresponds to the position on the racetrack surface, wherein the menu is disposed about a periphery of the display element surrounding a display area at which a visual portion of an audio/visual program is displayed and the shape of the racetrack surface corresponds to the shape of the menu; and operate the actuator to cause vibratory movement of the touch sensor to provide a perception of a virtual texture of the menu that corresponds to the location of the marker on the menu, wherein a virtual texture of a menu item displayed on the menu differs from a virtual texture of a space between menu items displayed on the menu.

The apparatus may further include a manually-operable control, wherein the shape of the touch-sensitive surface corresponds to the shape of the racetrack surface and the menu such that the touch-sensitive surface surrounds the manually-operable control in a manner corresponding to the manner in which the menu surrounds the display area.

The apparatus may be a remote control in which the processing device, the storage, the touch sensor and the actuator are disposed; the processing device may be caused to access a menu data stored in the storage that is received from another processing device; and the menu data may include location data indicating locations of menu items along the menu, and the processing device employs the location data in determining the virtual texture of the menu at the location corresponding to the position on the racetrack surface.

In another aspect, a method includes: causing a marker to be visually displayed at a location on a menu visually displayed on a display element that corresponds to a position at which a digit of a hand of a user touches a portion of a racetrack surface defined on a manually-operable touch-sensitive surface of a touch sensor, wherein the menu is disposed about a periphery of the display element surrounding a display area at which a visual portion of an audio/visual program is displayed and the shape of the racetrack surface corresponds to the shape of the menu; and operating an actuator coupled to the touch sensor to cause vibratory movement of the touch sensor to provide a perception of a virtual texture of the menu that corresponds to the location of the marker on the menu, wherein a virtual texture of a menu item displayed on the menu differs from a virtual texture of a space between menu items displayed on the menu.

In either aspect, the menu may have a ring shape where the menu is disposed about the periphery of a display element and the racetrack surface has a ring shape that substantially corresponds to the ring shape of the menu. Further, the ring shapes of the menu and the racetrack surface may be rectangular ring shapes having four sides, and the racetrack surface may be disposed about a periphery of the of the touch-sensitive surface of the touch sensor.

Other features and advantages of the invention will be apparent from the description and claims that follow.

DESCRIPTION OF THE DRAWINGS

FIG. 2 depicts correlations between movement of a digit on a racetrack sensor and movement of a marker on a racetrack menu of the UI of FIG. 1, as well as well aspects of navigation controls and movement of a second marker not on the racetrack menu.

FIG. 6 depicts provision of tactile feedback with the touch sensor of FIG. 4a.

DETAILED DESCRIPTION

What is disclosed and what is claimed herein is intended to be applicable to a wide variety of audio/visual devices, i.e., devices that are structured to be employed by a user to play an audio/visual program. It should be noted that although various specific embodiments of audio/visual devices (e.g., televisions, set-top boxes and hand-held remotes) are presented with some degree of detail, such presentations of specific embodiments are intended to facilitate understanding through the use of examples, and should not be taken as limiting either the scope of disclosure or the scope of claim coverage. It is intended that what is disclosed and what is claimed herein is applicable to audio/visual devices that employ a tuner and/or a network interface to receive an audio/visual program; that cooperate with other devices to play an audio/visual program and/or to cause an audio/visual program to be played; that are wirelessly connected to other devices; that are connected to other devices through electrically and/or optically conductive cabling; that are not connected to any other device, at all; and/or that are either portable or not. Still other configurations of audio/visual devices to which what is disclosed and what is claimed herein are applicable will be apparent to those skilled in the art.

Figure 1:
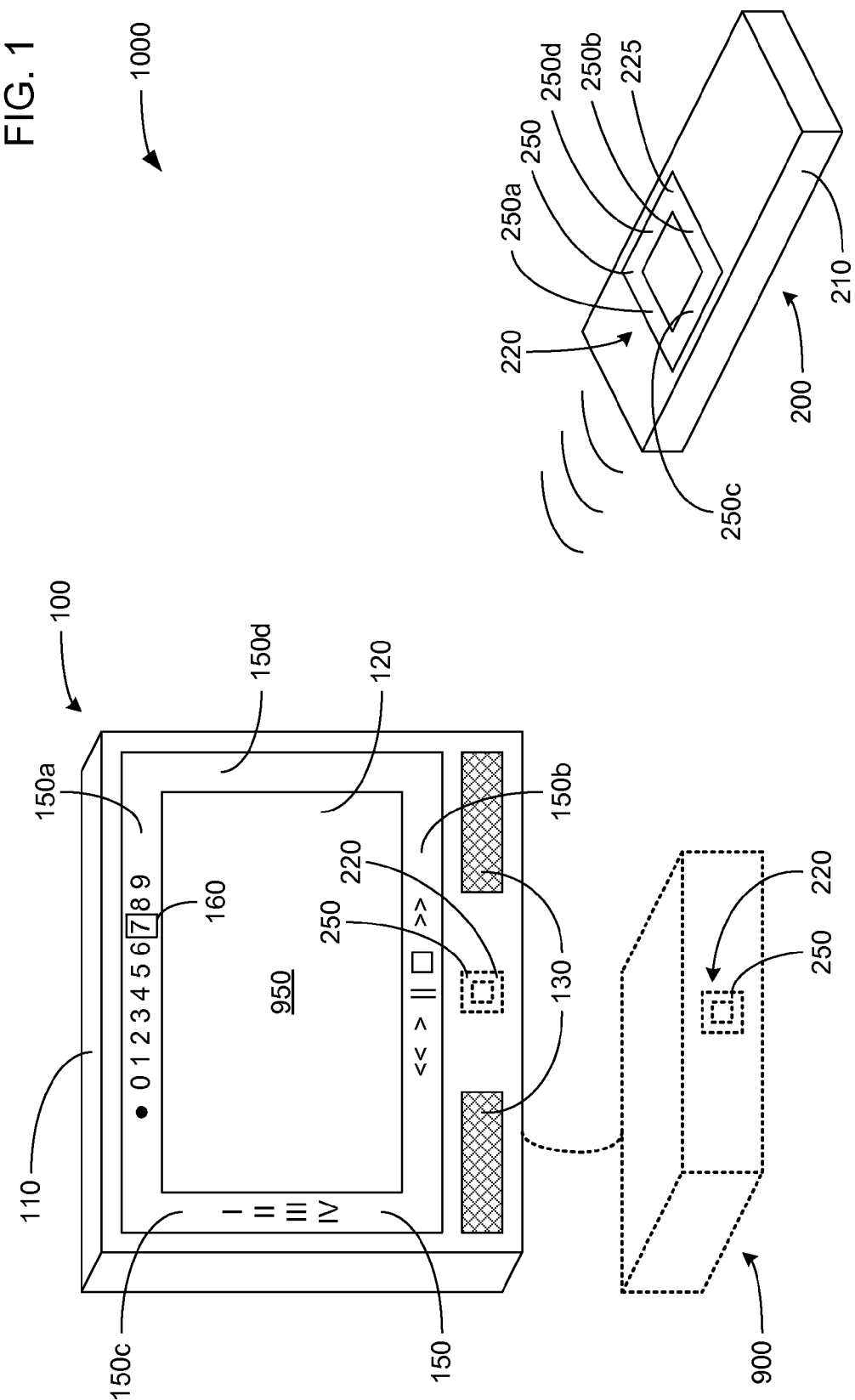
FIG. 1 is a perspective view of an embodiment of a user interface (UI).

FIG. 1 depicts a user interface 1000 enabling a user's hand-eye coordination to be employed to more intuitively operate at least one audio/visual device to select and play an audio/visual program. The user interface 1000 incorporates a displayed "racetrack" menu 150 and a corresponding "racetrack" surface 250. As depicted, the user interface 1000 is implemented by an interoperable set of devices that include at least an audio/visual device 100 and a handheld remote control 200, and may further include another audio/visual device 900. However, as will be explained in greater detail, the user interface 1000 may be fully implemented by a single audio/visual device, such as the audio/visual device 100.

The racetrack menu 150 is visually displayed on a display element 120 disposed on a casing 110 of the audio/visual device 100, and as depicted, the audio/visual device 100 is a flat panel display device such as a television, employing a flat panel form of the display element 120 such as a liquid crystal display (LCD) element or a plasma display element. Further, the audio/visual device 100 may further incorporate acoustic drivers 130 to acoustically output sound. However, as those skilled in the art will readily recognize, the racetrack menu 150 may be displayed by any of a variety of types of audio/visual device, whether portable or stationary, including and not limited to, a projector or a handheld device.

The racetrack surface 250 is defined on a touch-sensitive surface 225 of a touch sensor 220 disposed on a casing 210 of the handheld remote control 200, and as depicted, the touch-sensitive surface 225 has a rectangular ring shape that physically defines the shape and position of the racetrack surface 250 such that the racetrack surface 250 encompasses substantially all of the touch-sensitive surface of the touch sensor 220. However, the touch sensor 220 may be incorporated into any of a wide variety of devices, whether portable or stationary, including and not limited to, a wall-mounted control panel or a keyboard. Further, it is also envisioned that the touch sensor 220 may have a variant of the touch-sensitive surface 225 that is of a shape other than a ring shape with the racetrack surface 250 defined on that variant of the touch-sensitive surface 225 in another way such that the racetrack surface 250 encompasses only a subset of that variant of the touch-sensitive surface 225.

As depicted, both the racetrack menu 150 and the racetrack surface 250 have a ring shape that is a generally rectangular ring shape with corresponding sets of four sides. More specifically, the four sides 150a, 150b, 150c and 150d of the racetrack menu 150 are arranged to correspond to the four sides 250a, 250b, 250c and 250d of the racetrack surface 250. This four-sided nature of both of the racetrack menu 150 and the racetrack surface 250 is meant to accommodate the rectilinear nature of the vast majority of display elements currently found in audio/visual devices and the rectilinear nature of the visual portion of the vast majority of currently existing audio/visual programs that have a visual portion. However, it is important to note that other embodiments are possible in which the ring shape adopted by the racetrack surface 250 has a circular ring shape, an oval ring shape, a hexagonal ring shape or still other geometric variants of a ring shape. Further, where the racetrack menu 150 and/or the racetrack surface 250 have a ring shape that is other than a rectangular ring shape, one or both of the display element 120 and the touch sensor 220 may, themselves, have a shape other than the rectangular shapes depicted herein.

In differing embodiments, the four sides 150a-d of the racetrack menu 150 may either surround or overlie the edges of a display area 950 in which the visual portion of an audio/visual program selected via the user interface 1000 may be played. Where a selected audio/visual program does not have a visual portion (e.g., the audio/visual program is an audio recording having only an audio portion), the display area 950 may remain blank (e.g., display only a black or blue background color) or may display status information concerning the playing of the selected audio/visual program while being played, perhaps with the audio portion being acoustically output by the acoustic drivers 130. As depicted, the four sides 150a-d of the racetrack menu 150 are displayed by the display element 120 at the edges of the display element 120. However, it is also envisioned that the four sides 150a-d of the racetrack menu 150 may be positioned about the edges of a "window" of a graphical user interface of the type commonly employed in the operation of typical computer systems, perhaps where the audio/visual device 100 is a computer system on which audio/visual programs are selected and played through the user interface 1000.

As shown in FIG. 2, at various positions along one or more of the four sides 150a-d of the racetrack menu 150 are menu items 155 that may be selected by a user of the user interface 1000. The menu items 155 may include alphanumeric characters (such as those depicted along the side 150a) that may be selected to specify a channel or a website from which to select and/or receive an audio/visual program, symbols (such as those depicted along the side 150b) representing commands to control the operation of an audio/visual device capable of playing an audio/visual program (e.g., "play" and "stop" commands for a video cassette recorder, a disc media player, or solid state digital file player, etc.), and indicators of inputs (such as those depicted along the side 150c) to an audio/visual device that may be selected and through which an audio/visual program may be selected and/or received.

Although the various menu items 155 positioned along the racetrack menu 150 could conceivably serve any of a wide variety of purposes, it is envisioned that much of the functionality of the menu items 155 will be related to enabling a user to select an audio/visual program for playing, and/or to actually play an audio/visual program.

To operate the user interface 1000, a user places the tip of a digit of one of their hands (i.e., the tip of a thumb or finger) on a portion of the racetrack surface 250 defined on the touch-sensitive surface 225 of the touch sensor 220, and a marker 160 is displayed on a portion of the racetrack menu 150 that has a position on the racetrack menu 150 that corresponds to the position 260 on the racetrack surface 250 at which the tip of their digit is in contact with the touch-sensitive surface 225 of the touch sensor 220. FIG. 2 depicts how the marker 160 moves about and is constrained to moving about the racetrack menu 150 to maintain a correspondence between its location on the racetrack menu 150 and the position 260 of the digit on the racetrack surface 250 as the user moves that digit about the racetrack surface 250. In some embodiments, the marker 160 may move about the racetrack menu 150 in a manner in which the marker 160 "snaps" from being centered about one menu item 155 to an adjacent menu item 155 as the marker 160 is moved about a portion of the racetrack menu 150 having adjacent ones of the menu items 155. Further, such "snapping" of the marker 160 between adjacent ones of the menu items 155 may be accompanied by the concurrent acoustic output of some form of sound to provide further feedback to a user of the marker 160 moving from one such menu item 155 to another.

When the marker 160 is positioned over a menu item 155 that the user wishes to select, the user selects that menu item 155 by pressing whichever one of their digits that is already in contact with the racetrack surface 250 with greater pressure than was used in simply placing that digit in contact with the racetrack surface 250. A "click" or other sound accompanying the user's use of increased pressure on the racetrack surface 250 to select one of the menu items 155 may be acoustically output through an acoustic driver (not shown) incorporated into the remote control 200 and/or through the acoustic drivers 130.

Also depicted are additional controls 222, 224, 226, 227, 228 and 229 that may be employed to perform particular functions that may be deemed desirable to provide access to in a manner that does not require the selection of menu items to operate. In one possible variant, the controls 222, 224, 226, 227, 228 and 229 are operable as a power button, a source selection button, a volume rocker switch, a channel increment/decrement rocker switch, a mute button and a last channel return button, respectively. Where one of these additional controls is operable as a source selection button, its available use in selecting sources may be in addition to or in lieu of the provision of the ones of the menu items 155 depicted within side 150c as a mechanism for source selection.

As further depicted in FIG. 2, where a selected one of the sources 901-904 displays its own on-screen menu 170, either in place of a visual portion of an audio/visual program or overlying a visual portion of an audio/visual program, some embodiments of the user interface 1000 may support partly integrating the manner in which a user would navigate such an on-screen menu 170. In such embodiments, the touch sensor 220, with its ring shape (whether that ring shape is a rectangular ring shape, or a ring shape of a different geometry), may be configured to surround a set of controls for use in navigating the on-screen menu 170 just as the racetrack menu 150 surrounds the on-screen menu 170, itself.

In particular, the touch sensor 220 is depicted as being disposed on the casing 210 of the remote control 200 so as to surround navigation buttons 270a, 270b, 270c and 270d, as well as a selection button 280, that are also disposed on the casing 210. In alternate variants, other forms of one or more manually-operable controls may be surrounded by the touch sensor 220, in addition to or in place of the navigation buttons 270a-d and the selection button 280, including and not limited to, a joystick, or a four-way rocker switch that may either surround a selection button (such as the selection button 280) or be useable as a selection button by being pressed in the middle. As a result of the ring shape of the touch sensor 220 being employed to surround the navigation buttons 270a-d and the selection buttons 280, a nested arrangement of concentrically located manually operable controls is created. Depicted is an example form of possible on-screen menu that will be familiar to those skilled in the art, including various menu items 175 that may be selected via the selection button 280, and a marker 180 that may be moved by a user among the menu items 175 via the navigation buttons 270a-d. The concentrically nested arrangement of manually-operable controls surrounded by the racetrack surface 250 defined on the touch-sensitive surface 225 of the touch sensor 220 that is disposed on the casing 210 of the remote control 200 corresponds to the similarly nested arrangement of the on-screen menu 170 surrounded by the racetrack menu 150 that is displayed on the display element 120.

Figure 3:
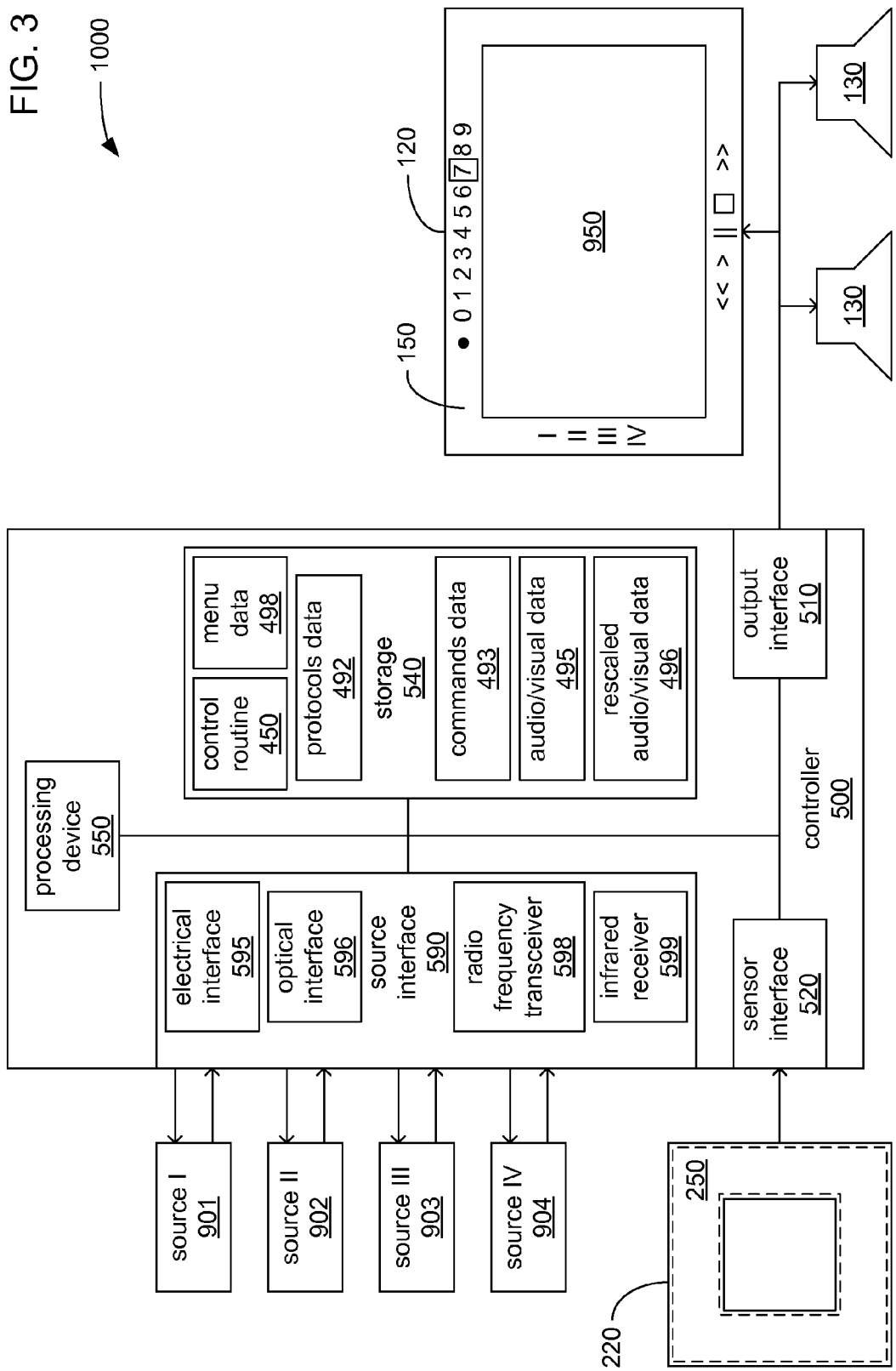
FIG. 3 is a block diagram of an electrical architecture of the UI of FIG. 1.

FIG. 3 is a block diagram of a possible electrical architecture by which the user interface 1000 may be provided. A controller 500 receives input through a user's use of at least the racetrack surface 250 defined on at least a portion of a touch-sensitive surface 225 of the touch sensor 220 to which the controller 500 is coupled, and provides at least the racetrack menu 150 as a visual output to the user through at least the display element 120 to which the controller 500 is also coupled. In various possible embodiments, the controller 500 may be incorporated directly into the audio/visual device 100, or into another audio/visual device 900 coupled to the audio/visual device 100 (shown in dotted lines in FIG. 1). As also depicted in FIG. 1, the remote control 200 communicates wirelessly through the emission of radio frequency, infrared or other wireless emissions to whichever one of the audio/visual devices 100 and 900 incorporates the controller 500. However, as those skilled in the art will readily recognize, the remote control 200 may communicate through an electrically and/or optically conductive cable (not shown) in other possible embodiments. Alternatively and/or additionally, the remote control 200 may communicate through a combination of wireless and cable-based (optical or electrical) connections forming a network between the remote control 200 and the controller 500. Still other embodiments may incorporate the touch sensor 220 directly on a user accessible portion of one or both of the audio/visual devices 100 and 900, either in addition to or as an alternative to providing the touch sensor 220 on the remote control 200.

The controller 500 incorporates multiple interfaces in the form of one or more connectors and/or one or more wireless transceivers by which the controller 500 is able to be coupled to one or more sources 901, 902, 903 and/or 904. Any such connectors may be disposed on the casing of whatever audio/visual device the controller 500 is incorporated into (e.g., the casing 110 of the audio/visual device 100 or a casing of the audio/visual device 900). In being so coupled, the controller 500 is able to transmit commands to one or more of the sources 901-904 to access and select audio/visual programs, and is able to receive audio/visual programs therefrom. Each of the sources 901-904 may be any of a variety of types of audio/visual device, including and not limited to, RF tuners (e.g., cable television or satellite dish tuners), disc media recorders and/or players, tape media recorders and/or players, solid-state or disk-based digital file players (e.g., a MP3 file player), Internet access devices to access streaming data of audio/visual programs, or docking cradles for portable audio/visual devices (e.g., a digital camera). Further, in some embodiments, one or more of the sources 901-904 may be incorporated into the same audio/visual device into which the controller 500 is incorporated (e.g., a built-in disc media player or built-in radio frequency tuner such that there would be no connector for it disposed on a casing). Still further, although each of the sources 901-904 is depicted as being directly coupled to the controller 500 in a point-to-point manner, those skilled in the art will readily recognize that one or more of the sources 901-904 may be coupled to the controller 500 indirectly through one or more of the others of the sources 901-904, or through a network formed among the sources 901-904 (and possibly incorporating routers, bridges and other relaying devices that will be familiar to those skilled in the art) with multiple cabling-based and/or wireless couplings.

Various industry standards for coupling audio/visual devices include specifications of commands that may be transmitted between audio/visual devices to control access to and/or control the playing of audio/visual programs. Where such an industry standard for coupling the controller 500 to one or more of the sources 901-904 is employed, the controller 500 may limit the commands transmitted to one or more of the sources 901-904 to the commands specified by that industry standard and map one or more of those commands to corresponding ones of the menu items 155 such that a user is able to cause the controller 500 to send those commands to one or more of the sources 901-904 by selecting those corresponding ones of the menu items 155. However, where such a standardized command set is unavailable, the controller 500 may employ any of a wide variety of approaches to identify one or more of the sources 901-904 to an extent necessary to "learn" what commands are appropriate to transmit and the manner in which they must be transmitted.

A user of the user interface 1000 may select one of the sources 901-904 as part of selecting an audio/visual program for being played by employing the racetrack surface 250 and the marker 160 to select one or more of the menu items 155 shown on the racetrack menu 150, such as the "I" through "IV" menu items 155 depicted as displayed by the controller 500 on the side 150c of the racetrack menu 150. Those menu items 155 depicted on the side 150c correspond to the sources 901 through 904, which are depicted as bearing "source I" through "source IV" as labels. The controller 500 receives input from the touch sensor 220 indicating the contact of the user's digit with a portion of the racetrack surface 250, indicating movement of the position 260 of contact of the digit about the racetrack surface 250, and indicating the application of greater pressure by the user through that digit against the touch sensor 220 at the position 260 (wherever the position 260 is at that moment) when selecting one of the menu items 155. The selection of one of the sources 901-904 by the user causes the controller 500 to switch to receiving audio/visual programs from that one of the sources 901-904, and to be ready to display any visual portion in the display area 950 and acoustically output any audio portion through the acoustic drivers 130 (or whatever other acoustic drivers may be present and employed for playing audio portions).

The selection of one of the sources 901-904 may further cause the controller 500 to alter the quantity and types of menu items 155 displayed on one or more of the sides 150a-d of the racetrack menu 150 such that the displayed menu items 155 more closely correspond to the functions supported by whichever one of the sources 901-904 that has been selected. By way of example, where one of the sources 901-904 that is able to record an audio/visual program was previously selected, the racetrack menu 150 may include one or more menu items 155 that could be selected to cause the controller 500 to transmit a command to that previously selected one of the sources 901-904 to cause it to start recording an audio/visual program. However, if the user then selects another one of the sources 901-904 that does not have the ability to record an audio/visual program, then the controller 500 would alter the menu items 155 displayed on the racetrack menu 150 to remove one or more menu items associated with recording an audio/visual program. In this way, at least a subset of the menu items 155 displayed on the racetrack menu 150 are "modal" in nature, insofar as at least that subset changes with the selection of different ones of the sources 901-904. Also, the coupling and/or uncoupling of one or more of the sources 901-904 to and/or from whatever audio/visual device into which the controller 500 is incorporated may also cause the controller 500 to alter the quantity and/or types of menu items 155 that are displayed in another example of at least a subset of the menu items 155 being modal in nature.

While at least some of the menu items 155 may be modal in nature such that they are apt to change depending on the selection and/or condition of one or more of the sources 901-904, others of the menu items 155 may not be modal in nature such that they are always displayed whenever the racetrack menu 150 is displayed. More specifically, where one or more of the sources 901-904 are incorporated into the same audio/visual device as the controller 500, the ones of the menu items 155 associated with those sources may remain displayed in the racetrack menu 150, regardless of the occurrences of many possible events that may cause other menu items 155 having a modal nature to be displayed, to not be displayed, or to be displayed in some altered form.

FIG. 3 also provides a block diagram of a possible architecture of the controller 500 that may be employed within the larger electrical architecture depicted in FIG. 3. As depicted, the controller 500 incorporates an output interface 510, a sensor interface 520, a storage 540, a processing device 550 and a source interface 590. The processing device 550 is coupled to each of the output interface 510, the sensor interface 520, the storage 540 and the source interface 590 to at least coordinate the operation of each to perform at least the above-described functions of the controller 500.

The processing device 550 may be any of a variety of types of processing device based on any of a variety of technologies, including and not limited to, a general purpose central processing unit (CPU), a digital signal processor (DSP), a microcontroller, or a sequencer. The storage 540 may be based on any of a variety of data storage technologies, including and not limited to, any of a wide variety of types of volatile and nonvolatile solid-state memory, magnetic media storage, and/or optical media storage. It should be noted that although the storage 540 is depicted in a manner that is suggestive of it being a single storage device, the storage 540 may be made up of multiple storage devices, each of which may be based on different technologies.

Each of the output interface 510, the sensor interface 520 and the source interface 590 may employ any of a variety of technologies to enable the controller 500 to communicate with other devices and/or other components of whatever audio/visual device into which the controller 500 is incorporated. More specifically, where the controller 500 is incorporated into an audio/visual device that also incorporates one or both of a display element (such as the display element 120) and at least one acoustic driver (such as the acoustic drivers 130), the output interface 510 may be of a type able to directly drive a display element, and/or able to directly drive one or more acoustic drivers. Alternatively, where one or both of a display element and acoustic drivers are not incorporated into the same audio/visual device into which the controller 500 is incorporated, the output interface 510 may be of a type employing cabling-based and/or a wireless signaling to transmit a signal to another audio/visual device into which a display element and/or acoustic drivers are incorporated.

Similarly, where the controller 500 is incorporated into an audio/visual device into which the touch sensor 220 is also incorporated, the sensor interface 520 may be of a type able to directly receive electrical signals emanating from the touch sensor 220. With such a more direct coupling, the sensor interface 520 may directly monitor a two-dimensional array of touch-sensitive points of the touch-sensitive surface 225 of the touch sensor 220 for indications of which touch-sensitive points are being touched by a tip of a user's digit, and thereby enable the processing device 550 to employ those indications to directly determine where the touch-sensitive surface 225 is being touched. Thus, a determination of whether or not the tip of the digit is touching a portion of the racetrack surface 250 and/or the position 260 by the processing device 550 may be enabled. However, where the controller 500 is incorporated into a device into which the touch sensor 220 is not also incorporated (e.g., the controller 500 is incorporated into the audio/visual device 100 and the touch sensor is incorporated into the remote control 200), the sensor interface 520 may be of a type able to receive cabling-based and/or wireless signaling transmitted by that other device (e.g., infrared signals emitted by the remote control 200). With such a more remote coupling, circuitry (not shown) that is co-located with the touch sensor 220 may perform the task of directly monitoring a two-dimensional array of touch-sensitive points of the touch-sensitive surface 225, and then transmit indications of which touch-sensitive points are being touched by the tip of a user's digit to the sensor interface 520.

Although it is possible that the audio/visual device into which the controller 500 is incorporated may not incorporate any sources (such as the sources 901-904) from which the controller 500 receives audio/visual programs, it is deemed more likely that the audio/visual device into which the controller 500 is incorporated will incorporate one or more of such sources in addition to being capable of receiving audio/visual programs from sources not incorporated into the same audio/visual device. By way of example, it is envisioned that the controller 500 may be incorporated into an audio/visual device into which a radio frequency tuner and/or an Internet access device is also incorporated to enable access to audio/visual programs for selection and playing without the attachment of another audio/visual device, while also having the capability of being coupled to another audio/visual device to receive still other audio/visual programs.

Thus, the source interface 590 incorporates one or more of an electrical interface 595, an optical interface 596, a radio frequency transceiver 598 and/or an infrared receiver 599. The electrical interface 595 (if present) enables the source interface 590 to couple the controller 500 to at least one source, whether incorporated into the same audio/visual device as the controller 500, or not, to receive electrical signals conveying an audio/visual program to the controller 500. The optical interface 596 (if present) enables the source interface 590 to couple the controller 500 to at least one source to receive optical signals conveying an audio/visual program to the controller 500. The radio frequency transceiver 598 (if present) enables the source interface 590 to wirelessly couple the controller 500 to at least one other audio/visual device functioning as a source to receive radio frequency signals conveying an audio/visual program to the controller 500 from that other audio/visual device. The infrared receiver 599 (if present) enables the source interface 590 to wirelessly couple the controller 500 to at least one other audio/visual device functioning as a source to receive infrared signals conveying an audio/visual program to the controller 500 from that other source. It should be noted that although the output interface 510 and the sensor interface 520 are depicted as separate from the source interface 590, it may be deemed advantageous, depending on the nature of the signaling supported, to combine one or both of the output interface 510 and the sensor interface 520 with the source interface 590.

Stored within the storage 540 are one or more of a control routine 450, a protocols data 492, a commands data 493, an audio/visual data 495, a resealed audio/visual data 496, and menu data 498. Upon being executed by the processing device 550, a sequence of instructions of the control routine 450 causes the processing device 550 to coordinate the monitoring of the touch sensor 220 for user input, the output of the racetrack menu 150 to a display element (e.g., the display element 120), the selection of a source of an audio/visual program to be played, and one or both of the display of a visual portion of an audio/visual program on a display element on which the racetrack menu 150 is also displayed and the acoustic output of an audio portion of the audio/visual program via one or more acoustic drivers (e.g., the acoustic drivers 130).

Upon execution, the control routine 450 causes the processing device 550 to operate the sensor interface 520 to await indications of a user placing a tip of a digit in contact with a portion of the racetrack surface 250 defined on a surface of the touch sensor 220, moving that digit about the racetrack surface 250 and/or applying greater pressure at the position 260 on the racetrack surface 250 to make a selection. Upon receiving an indication of activity by the user involving the racetrack surface 250, the processing device 550 may be caused to operate the output interface 510 to display the racetrack menu 150 with one or more of the menu items 155 positioned thereon and surrounding the display area 950 via a display element, if the racetrack menu 150 is not already being displayed. The processing device 550 is further caused to display and position at least the marker 160 on the racetrack menu 150 in a manner that corresponds to the position 260 of the user's digit on the racetrack surface 250. Further, in response to the passage of a predetermined period of time without receiving indications of activity by the user involving the racetrack surface 250, the processing device 550 may be caused to operate the output interface 510 to cease displaying the racetrack menu 150, and to display substantially little else on a display element than the display area 950.

As previously mentioned, in some embodiments, at a time when both the display area 950 and the racetrack menu 150 are displayed, the controller 500 reduces the size of the display area 950 to make room around the edges of the display area 950 for the display of the racetrack menu 150 on the display element 120, and in so doing, may rescale the visual portion (if there is one) of whatever audio/visual program may be playing at that time. In other embodiments, the display area 950 is not resized, and instead, the racetrack menu 150 is displayed in a manner in which the racetrack menu 150 overlies edge portions of the display area 950 such that edge portions of any visual portion of an audio/visual program are no longer visible. However, in those embodiments in which the racetrack menu overlies edge portions of the display area 950, the racetrack menu 150 may be displayed in a manner in which at least some portions of the racetrack menu have a somewhat "transparent" quality in which the overlain edge portions of any visual portion of an audio/visual program can still be seen by the user "looking through" the racetrack menu 150.

Upon execution, the control routine 450 causes the processing device 550 to operate the sensor interface 520 to await an indication of a selection of a menu item 155 that corresponds to selecting a source from which the user may wish an audio/visual program to be provided for playing, and may operate the source interface 590 to at least enable receipt of an audio/visual program from that selected source. Where an audio/visual program is received, the processing device 550 may be further caused to buffer audio and/or visual portions of the audio/visual program in the storage 540 as the audio/visual data 495. In embodiments in which a visual portion of an audio/visual program is rescaled to be displayed in the display area 950 at a time when the display area 950 is surrounded by the racetrack menu 150, the processing device 550 may be further caused to buffer the rescaled form of the visual portion in the storage 540 as the rescaled audio/visual program data 496.

Upon execution, the control routine 450 causes the processing device 550 to operate the sensor interface 520 to await an indication of a selection of a menu item 155 corresponding to the selection of a command (e.g., "play" or "record" commands, numerals or other symbols specifying a radio frequency channel to tune, etc.) to be transmitted to an audio/visual device serving as a source, and may operate the source interface 590 to transmit a command to that audio/visual device (e.g., one of sources 901-904) that corresponds to a menu item 155 that has been selected. In transmitting that command, the processing device 550 may be further caused to refer to the protocols data 492 for data concerning sequences of signals that must be transmitted by the source interface 590 as part of a communications protocol in preparation for transmitting the command, and/or the processing device 550 may be further caused to refer to the commands data 493 for data concerning the sequence of signals that must be transmitted by the source interface 590 as part of transmitting the command. As will be familiar to those skilled in the art, various industry-standardized forms of coupling between audio/visual devices make use of various protocols to organize various aspects of commands and/or data that are conveyed. In support of the processing device 550 responding to the selection of various ones of the menu items 155, the processing device 550 is further caused to store data correlating at least some of the various menu items with actions to be taken by the processing device 550 in response to their selection by the user in the storage 540 as the menu data 498.

Amidst operating the source interface 590 to enable receipt of an audio/visual program from a source selected by the user, the processing device 550 may be caused to operate the output interface 510 to alter the quantity and/or type of menu items 155 that are displayed at various positions on the racetrack menu 150. In so doing, the processing device 550 may be further caused to store information concerning the size, shape, color and other characteristics of the racetrack menu 150, at least some of the graphical representations of the menu items 155, and/or at least one graphical representation of the marker 160 in the storage 540 as part of the menu data 498.

In some embodiments, at a time when the racetrack menu 150 is not displayed (e.g., at a time when only the display area 950 is displayed), the controller 500 may do more than simply cause the racetrack menu 150 to be displayed in response to a user touching a portion of the racetrack sensor 250. More specifically, in addition to causing the racetrack menu 150 to be displayed, the controller 500 may take particular actions in response to particular ones of the sides 250a-d of the racetrack surface 250 being touched by a user at a time when the racetrack menu 150 is not being displayed. In a variation of such embodiments, it may be that causing the racetrack menu 150 to be displayed requires both a touch and some minimum degree of movement of the tip of a user's digit on the racetrack surface 250 (i.e., a kind of "touch-and-drag" or "wiping" motion across a portion of the racetrack surface 250), while other particular actions are taken in response to where there is only a touch of a tip of a user's digit on particular ones of the sides 250a-d of the racetrack sensor 250.

Figure 4A:
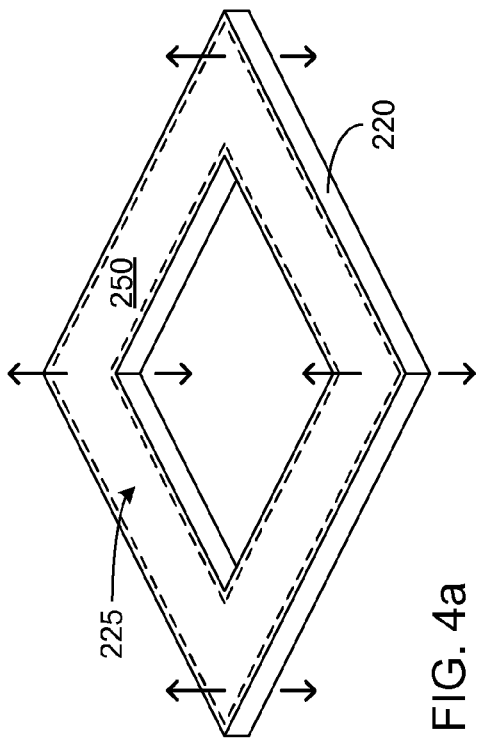
FIGS. 4a and 4b, together, depict and contrast possible variants of the touch sensor employed in the user interface of FIG. 1 that provide tactile feedback.
Figure 4B:
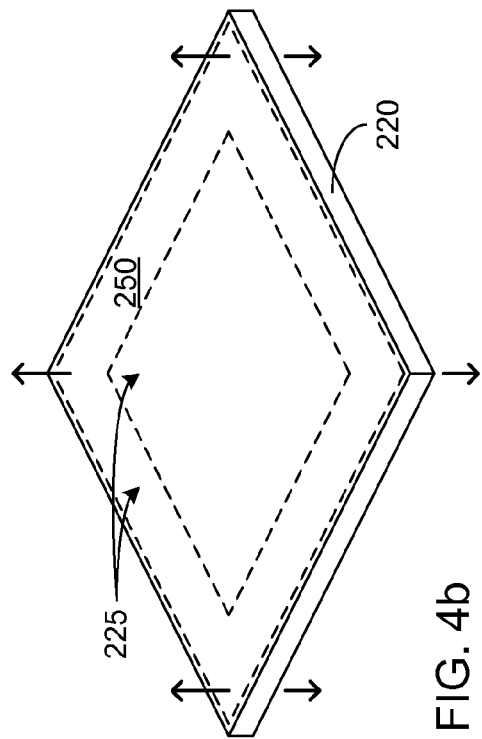

FIGS. 4a and 4b, taken together, depict and contrast two variants of the touch sensor 220. Both variants are depicted in perspective as distinct touch-sensitive devices disposed in a recess of a casing of a device (e.g., the casing 110 of the audio/visual device 100 or the casing 210 of the remote control 200).

FIG. 4a depicts a variant that has the ring shape that has been discussed as permitting other manually-operable controls (e.g., the navigation buttons 270a-d and the selection button 280) to be positioned in a manner in which they are surrounded by the shape of the touch sensor 220. Again, the ring shape of this variant of the touch sensor 220 provides a form of the touch-sensitive surface 225 that is bounded by the ring shape of the touch sensor 220, and this in turn defines the ring shape of the racetrack surface 250. Once again, although this variant of the touch sensor 220 is depicted as having a rectangular ring shape having four sides, other embodiments are possible in which the touch sensor 220 has a ring shape of a different geometry, such as a circular ring shape, an oval ring shape, a hexagonal ring shape, etc. It should also be noted that still other, non-ring, shapes are possible that only partly surround such other manually-operable controls, such as a "C" or "U" shape that surrounds on three sides, or such as an "L" that surrounds on two sides.

FIG. 4b depicts an alternate variant having a rectangular shape that provides a continuous form of the touch-sensitive surface 225 (i.e., there is no "hole" formed through the touch-sensitive surface 225). This continuous form of touch-sensitive surface more easily enables more than just the racetrack surface 250 to be defined thereon such that the racetrack surface 250 encompasses only a portion of the touch-sensitive surface 225 and leaves open the possibility of one or more other surfaces that serve other functions also being defined on thereon by a processing device executing a sequence of instructions of a routine (e.g., the processing device 550 executing the control routine 450). More specifically, and by way of example, the processing device 550 receives indications of which touch-sensitive points of an array of touch-sensitive points making up the touch-sensitive surface 225 are being touched by a tip of a user's digit, and then treats some of those touch-sensitive points as belonging to the racetrack surface 250 and others as belonging to other defined surfaces. For example, at least a portion of the touch-sensitive surface 225 that is surrounded by the racetrack surface 250 may be used to provide the equivalent function of the navigation buttons 270a-d and the selection button 280, such that they are implemented as navigation surfaces and a selection surface, respectively, defined on the touch-sensitive surface 225 of the touch sensor 220.

As depicted in FIGS. 4a-b with darkened sets of arrows, the hand-eye coordination of the user interface 1000 is augmented with tactile feedback to enable a user to better center the tip of a digit over one of the menu items 155 disposed along the racetrack surface 150 before pressing with greater force to select it. This tactile feedback is implemented by causing either of the depicted variants of the touch sensor 220 to vibrate with amplitudes and frequencies that provide an impression of at least some of the menu items 155 having a virtual texture (including textures as simple as a raised surface) such that the user is given the impression that they can "feel" the menu items 155. In essence, a user is given the impression that they are "touching" (in a virtual sense) at least some of the menu items 155 as they move a tip of a digit about the racetrack surface 250 as well as seeing the location 260 of that tip reflected by the location of the marker 160 on the racetrack menu 150. In one embodiment, one of the depicted variants of the touch sensor 220 is caused to rapidly vibrate in a motion that moves into and out of the casing recess in which it is disposed.

Figure 5:
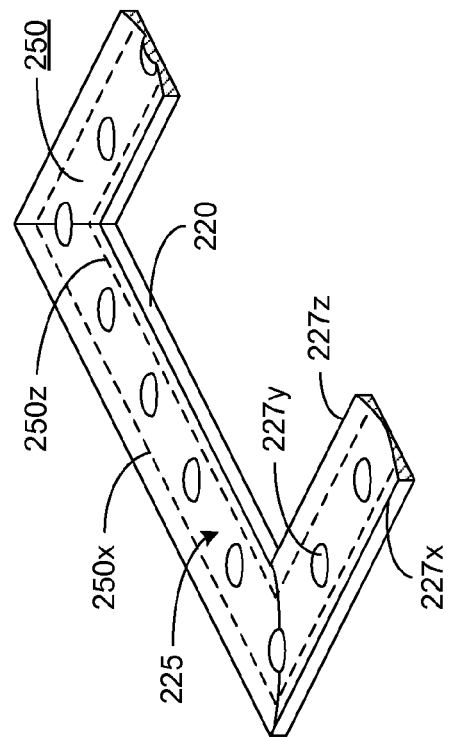
FIG. 5 depicts a resulting tactile perception of the touch sensors of FIGS. 4a-b.

FIG. 5 depicts one possible example of a perceived texture for the racetrack menu 150 that a user of the user interface 1000 may be provided with. At a minimum, this virtual texture for the racetrack menu 150 is made up of individual virtual textures for at least some of the menu items 155, and as depicted, these individual virtual textures may be simple rounded virtual bumps 227y that are perceived by the user as extending outwards towards them from the touch-sensitive surface to distinguish those particular menu items 155 from other features of the racetrack menu 150. In other embodiments, these individual virtual textures for menu items 155 may be more complex, possibly providing tactile impressions of shapes that in some way correspond to shapes that those menu items 155 are displayed with.

A significant advantage of creating the perception of menu items 155 having a texture through vibratory movement of the touch sensor 220 relative to a casing (and thereby, relative to the tip of a digit) over forming actual textures for menu items 155 in the touch-sensitive surface 225 is that the locations of the virtual textures on the touch-sensitive surface 225 can be changed as the quantity and/or locations of their corresponding menu items 155 along the racetrack menu 150 is changed. As previously discussed, the quantity and/or other characteristics of the menu items 155 may change in a modal manner as different sources of audio/visual programs are selected, if not for other possible reasons.

As also depicted in FIG. 5, the virtual texture for the racetrack menu 150 that the user is caused to perceive may also include a virtual "trough" made up of perceptions of virtual ridges 227x and 227z that follow the outer edge 250x and the inner edge 250z, respectively, of the racetrack surface 250 defined on the touch-sensitive surface 225 of whatever variant of the touch sensor 220 is used. The virtual ridges 227x and 227z that are perceived by a user as extending outward towards them distinguish the edges of the racetrack menu 150 (in a tactile sense) from other portions of the racetrack menu 150, thereby tending to provide the user a tactile guide as an aid to keeping the tip of a digit on the racetrack surface 250. Such guides along the edges of the racetrack surface 250 may encourage greater accuracy on the part of the user in interacting with the racetrack surface 250 by encouraging them to be more precise in how they press that tip of a digit against the racetrack surface 250 versus either an adjacent surface defined elsewhere for another function or an adjacent other manually-operable control (e.g., the navigation buttons 270a-d or the selection button 280).

Figure 6:
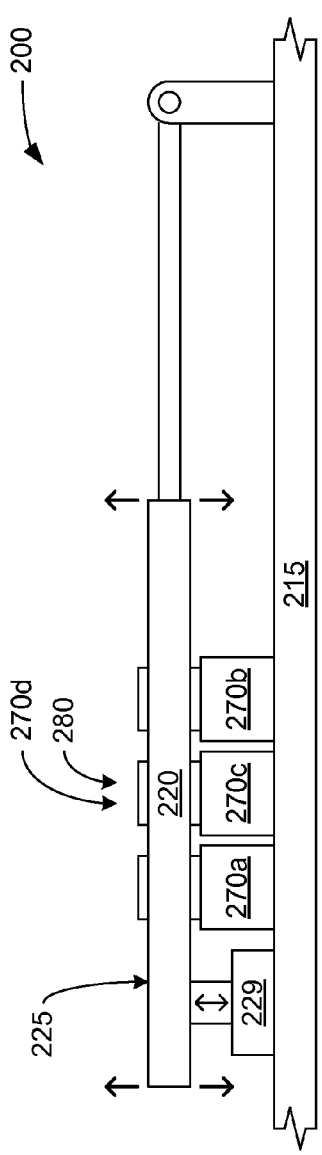

FIG. 6 depicts an edge-on view of the variant of the touch sensor 220 of FIG. 4a coupled by a pivot arm and hinge to a PCB 215, and depicts a side view of three of the navigation buttons 270a-c (the navigation button 270d and the selection button 280 being obscured from view) mounted to the PCB 215 and extending through the hole formed through this variant of the touch sensor 220. Also coupling this variant of the touch sensor 220 to the PCB 215 is an actuator 229, that is operable to move the touch sensor 220 towards and away from the PCB 215 a relative small distance sufficient for use in moving the touch sensor 220 in a vibratory manner. With the PCB 215 at least somewhat rigidly mounted to a portion of a casing on which the touch sensor 220 is disposed, such small vibratory movements of the touch sensor 220 (as effected by the actuator 229) become movements into and out of a portion of that casing that are able to impart the perception of virtual textures to a user of the user interface 1000, as has been described.

In some embodiments, the depicted pivot arm is relatively lengthy (though limited by the available space within whatever casing the touch sensor 220 is incorporated into) to at least somewhat approximate a more perpendicular-like and linear-like movement into and out of that casing. The actuator 229 maybe any of a variety of types electromechanical device capable of causing a relatively small amount of linear movement at a sufficiently rapid rate to support creating vibratory movement at frequencies high enough to provide the tactile perception of the types of virtual textures described above. Thus, the actuator 229 may be a linear motor, acoustic driver (with the touch sensor 220 substituted for a diaphragm), piezo-electric transducer, etc. Although a form of pushbutton switch (or equivalent, not shown) could still be interposed between the touch sensor 220 and the actuator 229 to detect the increased force exerted by a user to select one of the menu items 155, such a switch may be dispensed with entirely in an alternate embodiment in which characteristics of the flow of electric current through the actuator are monitored to detect a change consistent with increased force being exerted by a user against the touch sensor 220 to make a selection.

Whether the actuator 229 is operated to create vibratory movement to give the impression of a tip of a user's digit touching one of the menu items 155 or is operated to create vibratory movement to give the impression of that tip touching a space in the racetrack menu that lies between menu items 155 necessarily depends on accurately tracking the current position 260 of that tip on the racetrack surface 250. Where a given combination of an implementation of the touch sensor 220 and the actuator 229 are located within the same casing of an audio/visual device as the controller 500, it is possible that the processing device 550 (in executing a sequence of instructions of the control routine 450) would directly control the actuator 229 through the sensor interface 520. And thus, the processing device 550 would monitor the position 260 of that tip of that digit on the racetrack surface 250, would associate that position 260 with either overlying one of the menu items 155 or overlying a space between menu items 155, and would operate the actuator 229 to provide the appropriate virtual texture.

However, where a given combination of an implementation of the touch sensor 220 and the actuator 229 are located within a casing of an audio/visual device other than the one within which the controller 500 is disposed (e.g., where this combination is located within the casing 210 of the remote control 200), it is preferred that a separate processing device also located in that same casing be employed to control the nature of the virtual texture that is provided at any given time. This is especially preferred where the mechanism of communication between the separate audio/visual devices is susceptible to being interrupted, as in the case of an infrared link requiring an unobstructed line of sight to function, since a break in such communications may result in the correspondence between the current position 260 of the tip of a digit and the type of virtual texture that should be provided at that location.

Figure 7:
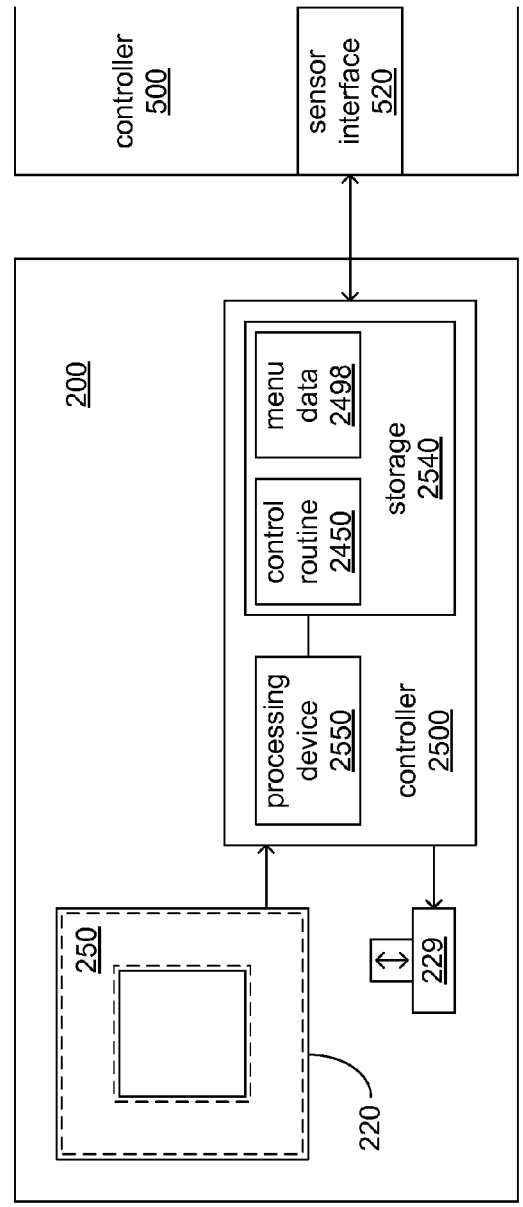
FIG. 7 depicts a possible augmentation of the electrical architecture of FIG. 3.

FIG. 7 depicts how the electrical architecture depicted in FIG. 3 may be augmented to provide such a separate and more local processing device disposed within the casing 210 of the remote control 200. More specifically, interposed between the sensor interface 520 of the controller 500 incorporated into one audio/visual device and the combination of the touch sensor 220 and the actuator 229 incorporated into the remote control 200 is an additional controller 2500 also incorporated into the remote control 200. The controller 2500 incorporates a processing device 2550 and a storage 2450 to which the processing device 2550 is coupled and in which is stored a control routine 2450 and menu data 2498.

In one possible embodiment, each time the racetrack menu 150 is displayed and/or its displayed set of menu items 155 is changed, data concerning at least the locations of the menu items 155 (if not also data concerning their virtual textures) is provided by the controller 500 to the controller 2500 to be stored in the storage 2540 as the menu data 2498. The processing device 2550, in accessing and executing a sequence of instructions of the control routine 2450, monitors the touch-sensitive surface 225 of the touch sensor 220 for the current location 260 of a tip of a user's digit, and employs at least the location data stored as part of the menu data 2498 to determine the manner in which the actuator 229 should be operated to provide the proper perception of virtual texture for that tip at that location 260 at that moment. More precisely, where the location data indicates that the location 260 overlies a menu item 155, then the processing device 2550 is caused by the control routine 2450 to operate the actuator 229 to provide vibratory movement of the touch sensor 220 to provide a virtual texture consistent with that tip of that digit touching that menu item 155. Correspondingly, where the location data indicates that the location 260 overlies a space between menu items 155, then the processing device 2550 is caused to operate the actuator 229 to provide a virtual texture consistent with that tip of that digit touch a space in the racetrack menu 150 that is between menu items 155. To conserve power, the processing device 2550 may cease operating the actuator 229 to cause vibratory movement in response to their being no tip of a digit in contact with the touch sensor 220.

Other implementations are within the scope of the following claims and other claims to which the applicant may be entitled.

The invention claimed is:

1. An apparatus comprising:
a touch sensor having a touch-sensitive surface that is manually operable with a digit of a hand of a user, and on which at least a portion of a racetrack surface is defined;
an actuator coupled to the touch sensor to cause vibratory movement of the touch sensor;
a processing device; and
a storage accessible to the processing device and storing a sequence of instructions that when executed by the processing device, causes the processing device to, in response to an indication of the digit touching the racetrack surface at a position on the racetrack surface:
cause a marker to be visually displayed at a location on a menu visually displayed on a display element that corresponds to the position on the racetrack surface, wherein the menu is disposed about a periphery of the display element surrounding a display area at which a visual portion of an audio/visual program is displayed and the shape of the racetrack surface corresponds to the shape of the menu;
cause the display area to be reduced in size to accommodate the menu, and cause the visual portion of the audio/visual program to be rescaled based on the reduced size;
store menu data corresponding to a location of a plurality of menu items on the menu and virtual textures associated with the plurality of menu items;
employ the menu data to determine a virtual texture that corresponds to the location of the marker on the menu; and
operate the actuator to cause vibratory movement of the touch sensor to provide a perception of the virtual texture, wherein a virtual texture of a menu item displayed on the menu differs from a virtual texture of a space between menu items displayed on the menu.

2. The apparatus of claim 1, wherein the virtual texture of a menu item is a virtual bump perceivable by a user of the apparatus as extending outward towards them.

3. The apparatus of claim 1, wherein the processing device is further caused to operate the actuator to cause vibratory movement of the touch sensor to provide a perception of a virtual ridge along an edge of the racetrack surface that corresponds to an edge of the menu.

4. The apparatus of claim 1, wherein the processing device is further caused, in response to an indication of the user increasing a pressure with which the user's digit touches the racetrack surface at the position and in response to the marker having been moved to a location in the vicinity of a menu item displayed on the menu, to cause the menu item to be selected, wherein causing the menu item to be selected comprises taking an action to cause the audio/visual program to be selected for playing.

5. The apparatus of claim 1, wherein the menu has a ring shape and the racetrack surface has a ring shape that substantially corresponds to the ring shape of the menu.

6. The apparatus of claim 5, wherein the ring shapes of the menu and the racetrack surface are rectangular ring shapes having four sides, and the racetrack surface is disposed about a periphery of the of the touch-sensitive surface of the touch sensor.

7. The apparatus of claim 1, further comprising a manually-operable control, wherein the shape of the touch-sensitive surface corresponds to the shape of the racetrack surface and the touch-sensitive surface surrounds the manually-operable control.

8. The apparatus of claim 1, wherein a navigation surface is defined on the touch-sensitive surface of the touch sensor at a position on the touch-sensitive surface that is surrounded by the racetrack surface.

9. The apparatus of claim 1, wherein the processing device is further caused to, in response to an indication of the digit touching the racetrack surface at a time when the menu is not displayed, cause the menu to be visually displayed and operate the actuator to cause vibratory movement of the touch sensor to provide a perception of the virtual texture of the menu.

10. The apparatus of claim 9, wherein the processing device is further caused, in response to an indication of the digit no longer touching the racetrack, ceasing to operate the actuator to cause vibratory movement of the touch sensor.

11. The apparatus of claim 10, wherein the processing device is further caused, in response to a predetermined period of time elapsing since the last indication of the digit touching the racetrack surface, causing the menu to cease to be visually displayed on the display element.

12. The apparatus of claim 1, wherein:
the apparatus is a remote control in which the processing device, the storage, the touch sensor and the actuator are disposed;
the processing device is caused to access a menu data stored in the storage that is received from another processing device; and
the menu data is comprised of location data indicating locations of menu items along the menu, and the processing device employs the location data in determining the virtual texture of the menu at the location corresponding to the position on the racetrack surface.

13. A method comprising:
causing a marker to be visually displayed at a location on a menu visually displayed on a display element that corresponds to a position at which a digit of a hand of a user touches a portion of a racetrack surface defined on a manually-operable touch-sensitive surface of a touch sensor, wherein the menu is disposed about a periphery of the display element surrounding a display area at which a visual portion of an audio/visual program is displayed and the shape of the racetrack surface corresponds to the shape of the menu;
causing the display area to be reduced in size to accommodate the menu, and causing the visual portion of the audio/visual program to be rescaled based on the reduced size;
storing menu data corresponding to a location of a plurality of menu items on the menu and virtual textures associated with the plurality of menu items;
employing the menu data to determine a virtual texture that corresponds to the location of the marker on the menu; and
operating an actuator coupled to the touch sensor to cause vibratory movement of the touch sensor to provide a perception of the virtual texture, wherein a virtual texture of a menu item displayed on the menu differs from a virtual texture of a space between menu items displayed on the menu.

14. The method of claim 13, wherein the virtual texture of a menu item is a virtual bump perceivable by a user of the apparatus as extending outward towards them.

15. The method of claim 13, further comprising operating the actuator to cause vibratory movement of the touch sensor to provide a perception of a virtual ridge along an edge of the racetrack surface that corresponds to an edge of the menu.

16. The method of claim 13, wherein the menu has a ring shape and the racetrack surface has a ring shape that substantially corresponds to the ring shape of the menu.

17. The method of claim 16, wherein the ring shapes of the menu and the racetrack surface are rectangular ring shapes having four sides, and the racetrack surface is disposed about a periphery of the of the touch-sensitive surface of the touch sensor.

18. The method of claim 13, wherein the shape of the touch-sensitive surface corresponds to the shape of the racetrack surface and the touch-sensitive surface surrounds a manually-operable control.

19. The method of claim 13, wherein a navigation surface is defined on the touch-sensitive surface of the touch sensor at a position on the touch-sensitive surface that is surrounded by the racetrack surface.

20. The method of claim 13, further comprising causing the menu to be visually displayed and operating the actuator to cause vibratory movement of the touch sensor to provide a perception of the virtual texture of the menu in response to an indication of the digit touching the racetrack surface at a time when the menu is not displayed.

21. The method of claim 20, further comprising ceasing to operate the actuator to cause vibratory movement of the touch sensor in response to an indication of the digit no longer touching the racetrack.

22. The method of claim 21, further comprising causing the menu to cease to be visually displayed on the display element in response to a predetermined period of time elapsing since the last indication of the digit touching the racetrack surface.

23. The method of claim 13, further comprising employing a processing device and a storage disposed within a remote control in which the touch sensor and actuator are disposed to:
monitor the position at which the racetrack surface is touched by a digit; and
access the storage to employ location data indicating locations of menu items along the menu that is received from another processing device to determine the virtual texture of the menu at the location corresponding to the position on the racetrack surface.

24. The apparatus of claim 1, wherein at least a portion of the menu is substantially transparent, such that a visual portion of an audio/visual program is visible through the portion of the menu.

25. The method of claim 13, wherein at least a portion of the menu is substantially transparent, such that a visual portion of an audio/visual program is visible through the portion of the menu.

26. An apparatus comprising:
a touch sensor having a touch-sensitive surface that is manually operable with a digit of a hand of a user, and on which at least a portion of a racetrack surface is defined;
an actuator coupled to the touch sensor to cause vibratory movement of the touch sensor;
a processing device; and
a storage accessible to the processing device and storing a sequence of instructions that when executed by the processing device, causes the processing device to, in response to an indication of the digit touching the racetrack surface at a position on the racetrack surface:
cause a marker to be visually displayed at a location on a menu visually displayed on a display element that corresponds to the position on the racetrack surface, wherein the menu is disposed about a periphery of the display element surrounding a display area at which a visual portion of an audio/visual program is displayed and the shape of the racetrack surface corresponds to the shape of the menu, and wherein the audio/visual program is received from one of a plurality of sources and the content of the menu depends on the source of the audio/visual program and a set of functions supported by the source;
store menu data corresponding to a location of a plurality of menu items on the menu and virtual textures associated with the plurality of menu items;
employ the menu data to determine a virtual texture that corresponds to the location of the marker on the menu; and
operate the actuator to cause vibratory movement of the touch sensor to provide a perception of the virtual texture, wherein a virtual texture of a menu item displayed on the menu differs from a virtual texture of a space between menu items displayed on the menu.

\* \* \* \* \*